(No Model.)

F. O. CREAGER.
SELF LOCKING CLEAT FOR ELECTRIC WIRING.

No. 536,684. Patented Apr. 2, 1895.

Witnesses:
Ray Hutchins
John F. Bray

Inventor:
Frank O. Creager

By Thos. H. Hutchins Attorney

UNITED STATES PATENT OFFICE.

FRANK O. CREAGER, OF MARSEILLES, ILLINOIS.

SELF-LOCKING CLEAT FOR ELECTRIC WIRING.

SPECIFICATION forming part of Letters Patent No. 536,684, dated April 2, 1895.

Application filed January 14, 1895. Serial No. 534,842. (No model.)

*To all whom it may concern:*

Be it known that I, FRANK O. CREAGER, a citizen of the United States of America, residing at Marseilles, in the county of La Salle and State of Illinois, have invented certain new and useful Improvements in Self-Locking Cleats for Electric Wiring, of which the following is a specification, reference being had therein to the accompanying drawings, and the letters of reference thereon, forming a part of this specification, in which—

Figure 1:
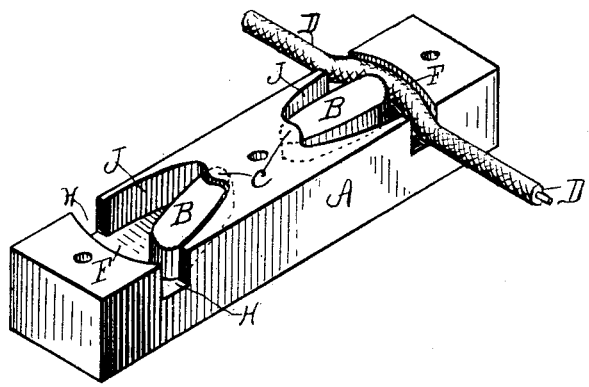
Figure 2:
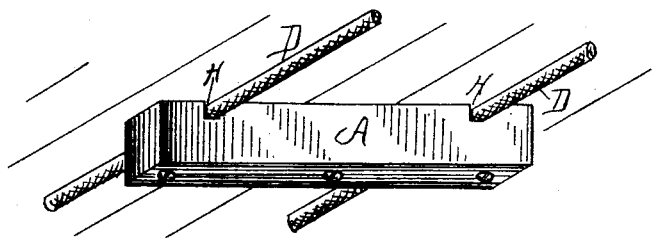
Figure 3:
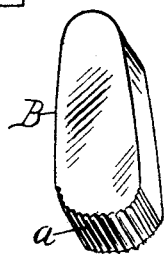

Figure 1 is a perspective view of the cleat as it would appear detached from a wall or ceiling. Fig. 2 is a perspective view of the cleat as it would appear secured to a ceiling and sustaining electric wires, and Fig. 3 is a perspective view of one of the dogs detached from the cleat.

This invention relates to certain improvements in self locking cleats for electric wiring, which improvements are fully set forth and explained in the following specification and claims.

Referring to the drawings A represents the cleat proper having the transverse recesses H for receiving the electric wires D, and having the recesses J adjacent to and opening into said transverse wire recesses for containing the dogs B which lie loosely in said recesses J and in such manner that the wires D may lie between the serrated end *a* of said dogs and the curved wall F of the cleat as shown in Fig. 1. The rear end of the dogs bear against the rear wall of the recess J, and under an over projecting lip C for holding the dog so that it will not get out of place. The use of the dogs is to engage the electric wires to hold them taut after they have been pulled up and stretched. The cleat and dogs are preferably made of porcelain, but may however be made of any other suitable material. As the dogs abut against the rear wall of the recesses in which they are contained, and are not held by any pivot, and do not turn on any pivot, they are of great strength in holding the wires, and are easily replaced in case they are broken or wear out.

In operation the electric wires are placed in their proper recess H as shown in Fig. 1, and the cleat is then secured to the ceiling or wall by means of screws as shown in Fig. 2. The wires D are then pulled up taut but in such manner as to bear against the serrated face of the dog, and when slackened a trifle carries the dog with it backward and causes the dog to close upon the wire and carry it into the curved wall F and hold it locked and taut so the wires will not present a ragged appearance on the wall.

Having thus described my invention, what I claim as new, and desire to secure by Letters Patent, is as follows:

1. The combination of the cleat A, having the curved transverse wire recess H, and the recess J opening into said wire recess, and the dog B adapted to lie loosely in said recess J and for engaging and holding the electric wire all arranged to operate substantially as set forth.

2. The combination of the cleat A having the curved transverse wire recess H and the recess J opening into said wire recess, and having the over-projecting lip C, and the dog B, arranged in said recess J, substantially as and for the purpose set forth.

3. As a new article of manufacture a cleat for electric wiring having a transverse wire recess, a recess contiguous to said wire recess, and a dog in said contiguous recess arranged loosely therein and adapted to engage and hold taut the electric wire substantially as set forth.

4. As a new article of manufacture, a cleat for electric wiring having a recess and a dog loosely arranged in said recess for engaging and holding taut an electric wire against the curved wall of a transverse recess, all combined and arranged to operate substantially as and for the purpose set forth.

FRANK O. CREAGER.

Witnesses:
R. F. KNOTT,
C. H. CONNARD.